United States Patent
Kimura et al.

(10) Patent No.: US 10,300,344 B2
(45) Date of Patent: May 28, 2019

(54) GOLF BALL

(71) Applicant: Bridgestone Sports Co., Ltd., Tokyo (JP)

(72) Inventors: Akira Kimura, Chichibushi (JP); Toru Ogawana, Chichibushi (JP); Katsunobu Mochizuki, Chichibushi (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

(21) Appl. No.: 15/848,582

(22) Filed: Dec. 20, 2017

(65) Prior Publication Data

US 2018/0133560 A1    May 17, 2018

Related U.S. Application Data

(63) Continuation-in-part of application No. 15/281,284, filed on Sep. 30, 2016, now Pat. No. 9,889,342.

(30) Foreign Application Priority Data

Oct. 20, 2015  (JP) ................................. 2015-206609

(51) Int. Cl.
*A63B 37/00* (2006.01)
*C08G 18/00* (2006.01)

(52) U.S. Cl.
CPC ...... *A63B 37/0075* (2013.01); *A63B 37/0022* (2013.01); *A63B 37/0063* (2013.01);
(Continued)

(58) Field of Classification Search
CPC ..... A63B 37/06; A63B 37/04; A63B 37/0075; A63B 37/0076; A63B 37/0003;
(Continued)

(56) References Cited

U.S. PATENT DOCUMENTS

| | | | |
|---|---|---|---|
| 5,033,748 A * | 7/1991 | Ebisuno | A63B 37/0003 473/371 |
| 5,782,707 A | 7/1998 | Yamagishi et al. | |

(Continued)

FOREIGN PATENT DOCUMENTS

| | | |
|---|---|---|
| JP | 09-239068 A | 9/1997 |
| JP | 2001-054588 A | 2/2001 |

(Continued)

*Primary Examiner* — John E Simms, Jr.
(74) *Attorney, Agent, or Firm* — Sughrue Mion, PLLC

(57) ABSTRACT

In order to satisfy at a high level the golf ball flight and control performances relied on by professional golfers and skilled amateurs, this invention provides a multi-piece solid golf ball G having a core 1, a cover 3 and an intermediate layer 2 therebetween wherein, letting Hc be the JIS-C hardness at a center of the core, H12 be the JIS-C hardness at a position 12 mm from the core center and Ho be the JIS-C hardness at a surface of the core, the core has a hardness profile which satisfies the condition (Ho−H12)−(H12−Hc)≥10; letting (Ho−H12)−(H12−Hc) above be A, the spin index of the ball, defined as the dynamic coefficient of friction of the ball multiplied by A, is at least 3.0; and the hardness profile index, defined as the deflection (mm) of the core when compressed under a final load of 1,275 N (130 kgf) from an initial load of 98 N (10 kgf) multiplied by A, is at least 40.

10 Claims, 1 Drawing Sheet

(52) U.S. Cl.
CPC ...... *A63B 37/0065* (2013.01); *A63B 37/0076* (2013.01); *A63B 37/0077* (2013.01); *A63B 37/0092* (2013.01); *A63B 37/0096* (2013.01); *C08G 18/00* (2013.01)

(58) Field of Classification Search
CPC . A63B 37/005; A63B 37/006; A63B 37/0063; A63B 37/0022; A63B 37/0092
See application file for complete search history.

(56) References Cited

U.S. PATENT DOCUMENTS

| | | | |
|---|---|---|---|
| 6,210,295 B1 | 4/2001 | Yoneyama | |
| 6,458,307 B2* | 10/2002 | Inoue | A63B 37/0003 264/232 |
| 6,592,470 B2 | 7/2003 | Watanabe et al. | |
| 6,663,507 B1 | 12/2003 | Watanabe et al. | |
| 6,702,695 B1 | 3/2004 | Higuchi et al. | |
| 6,723,008 B2 | 4/2004 | Higuchi et al. | |
| 6,739,986 B2 | 5/2004 | Higuchi et al. | |
| 6,746,345 B2 | 6/2004 | Higuchi et al. | |
| 6,746,347 B2 | 6/2004 | Higuchi et al. | |
| 6,814,676 B2 | 11/2004 | Watanabe et al. | |
| 7,959,524 B2 | 6/2011 | Nanba et al. | |
| 8,393,978 B2 | 3/2013 | Watanabe et al. | |
| 2003/0104880 A1* | 6/2003 | Fushihara | A63B 37/0003 473/378 |
| 2009/0111608 A1* | 4/2009 | Watanabe | A63B 37/0004 473/373 |
| 2010/0056299 A1* | 3/2010 | Egashira | A63B 37/0095 473/351 |
| 2010/0056304 A1* | 3/2010 | Egashira | A63B 37/0003 473/378 |
| 2012/0157234 A1 | 6/2012 | Kimura | |
| 2013/0109507 A1* | 5/2013 | Onuki | A63B 37/0074 473/376 |
| 2013/0172113 A1* | 7/2013 | Isogawa | A63B 37/0003 473/373 |
| 2013/0296072 A1 | 11/2013 | Nakajima et al. | |
| 2013/0296075 A1* | 11/2013 | Kimura | A63B 37/0092 473/373 |
| 2013/0296076 A1 | 11/2013 | Kimura et al. | |
| 2013/0324318 A1* | 12/2013 | Isogawa | A63B 37/0076 473/373 |
| 2014/0073461 A1 | 3/2014 | Ozawa et al. | |
| 2014/0100059 A1* | 4/2014 | Kimura | A63B 37/0081 473/374 |
| 2014/0187351 A1* | 7/2014 | Nakamura | A63B 37/0092 473/373 |
| 2017/0173398 A1* | 6/2017 | Tachibana | A63B 37/0022 |

FOREIGN PATENT DOCUMENTS

| | | |
|---|---|---|
| JP | 2002-085587 A | 3/2002 |
| JP | 2002-085588 A | 3/2002 |
| JP | 2002-085589 A | 3/2002 |
| JP | 2002-186686 A | 7/2002 |
| JP | 2002-315848 A | 10/2002 |
| JP | 2003-190330 A | 7/2003 |
| JP | 2004-049913 A | 2/2004 |
| JP | 2009-034505 A | 2/2009 |
| JP | 2011-120898 A | 6/2011 |

* cited by examiner

GOLF BALL

CROSS-REFERENCE TO RELATED APPLICATION

This application is a continuation-in-part of copending application Ser. No. 15/281,284 filed on Sep. 30, 2016, the entire contents of which are hereby incorporated by reference.

BACKGROUND OF THE INVENTION

The present invention relates to a multi-piece solid golf ball having a core, an intermediate layer, a cover and a paint film layer. More specifically, the invention relates to a multi-piece solid golf ball which can satisfy at a high level the flight and control performance relied on by professional golfers and skilled amateurs.

In the art relating to golf balls of two or more pieces having a core and a cover and to multi-piece solid golf balls of three or more pieces having a core, an intermediate layer and a cover, a number of disclosures have hitherto been made which focus on the hardness profile in the core and on the hardness relationship between the intermediate layer and the cover, the intermediate layer material and the like. Such golf balls are described in, for example, JP-A 9-239068, JP-A 2003-190330, JP-A 2004-49913, JP-A 2002-315848, JP-A 2001-54588, JP-A 2002-85588, JP-A 2002-85589, JP-A 2002-85587, JP-A 2002-186686, JP-A 2009-34505 and JP-A 2011-120898.

However, there has been room for further improvement in the core hardness profile of such golf balls. Also, from a standpoint other than that of seeking to optimize the core hardness profile and the overall hardness and thickness parameters of the ball, there has existed a desire for a solid golf ball which, by increasing the distance on shots with a driver (W#1) and improving the spin performance on approach shots with various short irons, has an even more improved performance than in the prior art.

SUMMARY OF THE INVENTION

It is therefore an object of this invention to provide a golf ball which enhances performance more than conventional golf balls and is able to satisfy at a high level the flight and control performance relied on by professional golfers and skilled amateurs.

As a result of extensive investigations, we have discovered that, assuming a ball construction having an intermediate layer between a core and a cover and having also a paint film layer formed on the cover surface, by specifying the core hardness profile and focusing on the relationship between the core hardness profile and the dynamic coefficient of friction, the performance can be enhanced relative to conventional golf balls, enabling the ball to satisfy at a high level the flight and control performance relied on by professional golfers and skilled amateurs. That is, we have found that, in the core hardness profile, by providing an inner zone of the core with a relatively gradual hardness gradient and an outer zone of the core with a relatively steep hardness gradient, and by making the hardness difference between the core inner and outer zones large, an even larger reduction in the spin rate of the ball on full shots can be achieved. We have also found that, defining the numerical value obtained by multiplying the hardness difference between the inner and outer zones by the dynamic coefficient of friction for the overall ball as the "spin index" for the ball, when this spin index is larger than a given value, the balance between the spin rate-lowering effect on full shots and the spin rate on approach shots (controllability) improves.

Accordingly, the invention provides the following golf ball.

1. A multi-piece solid golf ball having a core, a cover and an intermediate layer therebetween and having a paint film layer formed on a surface of the cover, wherein, letting Hc be the JIS-C hardness at a center of the core, H12 be the JIS-C hardness at a position 12 mm from the core center and Ho be the JIS-C hardness at a surface of the core, the core has a hardness profile which satisfies condition (3) below $$(Ho-H12)-(H12-Hc) \geq 10 \qquad (3)$$

(with the proviso that $65 \leq Ho \leq 99$ and $40 \leq Hc \leq 78$); letting (Ho–H12)–(H12–Hc) in condition (3) be A, the spin index of the ball, defined as the dynamic coefficient of friction for the ball multiplied by A, is at least 3.0; and the hardness profile index, defined as the deflection (mm) of the core when compressed under a final load of 1,275 N (130 kgf) from an initial load of 98 N (10 kgf) multiplied by A, is at least 40.

2. The golf ball of 1 above, wherein the surface of the cover is treated with a polyisocyanate compound that is free of organic solvent.

3. The golf ball of 2 above, wherein the polyisocyanate compound is one, or a mixture of two or more, selected from the group consisting of tolylene-2,6-diisocyanate, tolylene-2,4-diisocyanate, 4,4'-diphenylmethane diisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives thereof, and prepolymers formed of said polyisocyanate compounds.

4. The golf ball of 1 above, wherein the paint film layer has an elastic work recovery of from 30 to 98%.

5. The golf ball of 1 above, wherein the dynamic coefficient of friction for the ball is at least 0.300.

6. The golf ball of 1 above which satisfies condition (4) below:

$$20 \leq Ho-Hc \leq 45. \qquad (4)$$

7. The golf ball of 1 above, wherein the core has a two-layer construction consisting of an inner layer and an outer layer.

8. The golf ball of 7 above which satisfies the following condition:

(JIS-C hardness at surface of sphere obtained by encasing core with intermediate layer)–(JIS-C hardness at surface of inner core layer)≥25.

BRIEF DESCRIPTION OF THE DIAGRAMS

DETAILED DESCRIPTION OF THE INVENTION

The invention is described more fully below.

Figure 1:
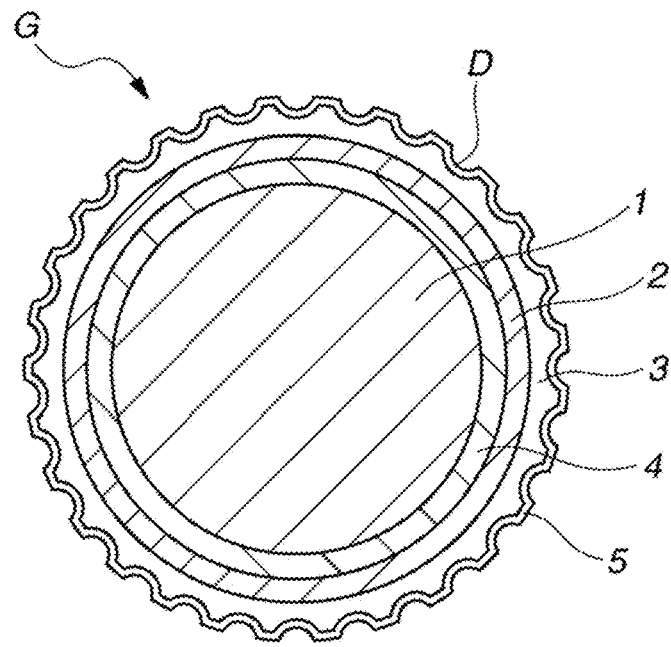
FIG. 1 is schematic cross-sectional view of a golf ball according to one embodiment of the invention.

The golf ball of the invention has, in order from the inside: a core, an intermediate layer and a cover. Referring to FIG. 1, which shows the internal structure in one embodiment of the golf ball of the invention, the golf ball G has a core 1, an intermediate layer 2 encasing the core 1, and a cover 3 encasing the intermediate layer 2. A paint film layer 5 is formed on the surface of the cover. Numerous dimples D are generally formed on the surface of the cover 3 in order to improve the aerodynamic properties of the ball. In addition, the golf ball G in FIG. 1 has an envelope layer 4 formed between the core 1 and the intermediate layer 2. The respective layers are described in detail below.

The core diameter, although not particularly limited, is preferably from 34.7 to 41.7 mm, more preferably from 35.7 to 40.7 mm, and even more preferably from 36.7 to 39.7 mm. When the core diameter is too small, the spin rate-lowering effect of the core may not be exhibited, as a result of which the intended distance may not be obtained. When the core diameter is too large, the durability of the ball may worsen.

The core deflection (mm) when compressed under a final load of 1,275 N (130 kgf) from an initial load of 98 N (10 kgf), although not particularly limited, is preferably from 2.5 to 4.6 mm, more preferably from 2.7 to 4.4 mm, and even more preferably from 2.9 to 4.2 mm. When the core is too hard, the spin rate may rise excessively, possibly resulting in a poor distance. On the other hand, when the core is too soft, the initial velocity of the ball may decrease, possibly resulting in a poor distance.

The JIS-C hardness at the center of the core, represented herein as "Hc," is preferably from 40 to 78, more preferably from 45 to 73, and even more preferably from 50 to 68. When the JIS-C hardness at the core center is too large, the spin rate may rise, possibly resulting in a poor distance. On the other hand, when this value is too small, the initial velocity of the ball may decrease, possibly resulting in a poor distance.

The JIS-C hardness at the surface of the core, represented herein as "Ho," is preferably from 65 to 99, more preferably from 70 to 98, and even more preferably from 75 to 97. When the JIS-C hardness at the core surface is too large, the durability on repeated impact may worsen. On the other hand, when this value is too small, the spin rate on full shots may not be suppressed, possibly resulting in a poor distance.

The JIS-C hardness at a position 12 mm from the core center, represented herein as "H12," is preferably from 42 to 84, more preferably from 47 to 79, and even more preferably from 52 to 74. When this value is too large, the spin rate on full shots may not be suppressed, possibly resulting in a poor distance. On the other hand, when this value is too small, the durability on repeated impact may worsen.

The center hardness and cross-sectional hardnesses at specific positions refer to the hardnesses measured at the center and specific positions on a cross-section obtained by cutting the golf ball core in half through the center. The surface hardness refers to the hardness measured on the spherical surface of the core.

In this invention, the core satisfies condition (3) below:

$$(Ho-H12)-(H12-Hc) \geq 10. \quad (3)$$

Condition (3) means that the hardness difference between the inner and outer zones of the core is large, further lowering the spin rate on full shots and enabling the desired effects of the invention to be achieved. The (Ho−H12)−(H12−Hc) value is at least 10, preferably at least 10.5, and more preferably at least 11. When this value is too small, the spin rate on full shots may not be suppressed, possibly resulting in a poor distance.

In this invention, the core preferably satisfies also conditions (1), (2) and (4) below.

$$0 \leq H12-Hc \leq 15, \quad (1)$$

$$15 \leq Ho-H12 \leq 35, \text{ and} \quad (2)$$

$$20 \leq Ho-Hc \leq 45. \quad (4)$$

Condition (1) means that the inner zone of the core has a relatively gradual hardness gradient. The lower limit value for H12−Hc is preferably at least 0, more preferably at least 1, and even more preferably at least 2. The upper limit value is preferably not more than 15, more preferably not more than 14, and even more preferably not more than 13. When this value is too large, the durability to repeated impact may worsen. On the other hand, when this value is too small, the spin rate on full shots may not be suppressed, possibly resulting in a poor distance.

Condition (2) means that the outer zone of the core has a relatively steep hardness gradient. The lower limit value for Ho−H12 is preferably at least 15, more preferably at least 16, and even more preferably at least 17. The upper limit value is preferably not more than 35, more preferably not more than 32, and even more preferably not more than 28. When this value is too large, the durability to repeated impact may worsen. On the other hand, when this value is too small, the spin rate on full shots may not be suppressed, possibly resulting in a poor distance.

Condition (4) means that the hardness difference between the core center and core surface is large. The lower limit value for Ho−Hc is preferably at least 20, more preferably at least 21, and even more preferably at least 22. The upper limit value is preferably not more than 45, more preferably not more than 40, and even more preferably not more than 38. When this value is too large, the durability to repeated impact may worsen. On the other hand, when this value is too small, the spin rate on full shots may not be suppressed, possibly resulting in a poor distance.

Letting (Ho−H12)−(H12−Hc) in condition (3) be A, the hardness profile index, defined as the deflection (mm) of the core when compressed under a final load of 1,275 N (130 kgf) from an initial load of 98 N (10 kgf) multiplied by A, is preferably at least 40, more preferably at least 41, and even more preferably at least 42. By setting the hardness profile index in this range, the index remains within the specified range even when the core deflection is changed, enabling a reduced spin rate to be achieved on full shots.

The core can be obtained by vulcanizing a rubber composition composed primarily of a rubber material. Although the rubber composition is not particularly limited, in a preferred embodiment, the core may be formed using a rubber composition containing, for example, a base rubber, a co-crosslinking agent, a crosslinking initiator, sulfur, an organosulfur compound, a filler and an antioxidant. A polybutadiene is preferably used as the base rubber in this rubber composition.

Rubber components other than this polybutadiene may be included in the base rubber within a range that does not detract from the advantageous effects of the invention. Examples of such other rubber components include other polybutadienes and diene rubbers other than polybutadiene, such as styrene-butadiene rubber, natural rubber, isoprene rubber and ethylene-propylene-diene rubber.

The co-crosslinking agent, which is not particularly limited in this invention, is exemplified by unsaturated carboxylic acids and metal salts of unsaturated carboxylic acids. Illustrative examples of unsaturated carboxylic acids include acrylic acid, methacrylic acid, maleic acid and fumaric acid. The use of acrylic acid or methacrylic acid is especially preferred. Metal salts of unsaturated carboxylic acids are exemplified by the foregoing unsaturated carboxylic acids which have been neutralized with the desired metal ions. Illustrative examples include the zinc salts and magnesium salts of methacrylic acid and acrylic acid. The use of zinc acrylate is especially preferred. These unsaturated carboxylic acids and/or metal salts thereof are included in an amount per 100 parts by weight of the base rubber which is preferably at least 10 parts by weight, more preferably at least 15 parts by weight, and even more preferably at least 20 parts by weight. The upper limit is preferably not more than 45 parts by weight, more preferably not more than 43 parts by weight, and even more preferably not more than 41 parts by weight.

An organic peroxide is preferably used as the crosslinking initiator. Specifically, the use of an organic peroxide having a relatively high thermal decomposition temperature is preferred. For example, an organic peroxide having an elevated one-minute half-life temperature of from about 165° C. to about 185° C., such as a dialkyl peroxide, may be used. Illustrative examples of dialkyl peroxides include dicumyl peroxide ("Percumyl D," from NOF Corporation), 2,5-dimethyl-2,5-di(t-butylperoxy)hexane ("Perhexa 25B," from NOF Corporation), and di(2-t-butylperoxyisopropyl) benzene ("Perbutyl P," from NOF Corporation). Preferred use can be made of dicumyl peroxide. These may be used singly or two or more may be used in combination. The half-life is one indicator of the organic peroxide decomposition rate, and is expressed as the time required for the original organic peroxide to decompose and the active oxygen content therein to fall to one-half. The vulcanization temperature for the core-forming rubber composition is generally in the range of from 120 to 190° C. Within this range, the thermal decomposition of high-temperature organic peroxides having a one-minute half-life temperature of about 165° C. to about 185° C. is relatively slow. With the rubber composition of the invention, by regulating the amount of free radicals generated, which increases as the vulcanization time elapses, a crosslinked rubber core having a specific internal hardness profile is obtained.

The crosslinking initiator is included in an amount, per 100 parts by weight of the base rubber, of preferably at least 0.1 part by weight, more preferably at least 0.2 part by weight, and even more preferably at least 0.3 part by weight. The upper limit is preferably not more than 5.0 parts by weight, more preferably not more than 4.0 parts by weight, even more preferably not more than 3.0 parts by weight, and most preferably not more than 2.0 parts by weight. Including too much may make the core too hard, possibly resulting in an unpleasant feel at impact and greatly lowering the durability to cracking. On the other hand, when too little is included, the core may become too soft, possibly resulting in an unpleasant feel at impact and greatly lowering productivity.

Fillers that may be suitably used include zinc oxide, barium sulfate and calcium carbonate. These may be used singly or two or more may be used in combination. The amount of filler included per 100 parts by weight of the base rubber may be set to preferably at least 1 part by weight, and more preferably at least 3 parts by weight. The upper limit in the amount included per 100 parts by weight of the base rubber may be set to preferably not more than 200 parts by weight, more preferably not more than 150 parts by weight, and even more preferably not more than 100 parts by weight. At a filler content which is too high or too low, a proper weight and a suitable rebound may be impossible to obtain.

In the practice of the invention, an antioxidant is included in the rubber composition. For example, use may be made of a commercial product such as Nocrac NS-6, Nocrac NS-30 or Nocrac 200 (all products of Ouchi Shinko Chemical Industry Co., Ltd.). These may be used singly, or two or more may be used in combination.

The amount of antioxidant included per 100 parts by weight of the base rubber, although not particularly limited, is preferably at least 0.05 part by weight, and more preferably at least 0.1 part by weight. The upper limit is preferably not more than 1.0 part by weight, more preferably not more than 0.7 part by weight, and even more preferably not more than 0.4 part by weight. When the antioxidant content is too high or too low, a suitable core hardness gradient may not be obtained, as a result of which it may not be possible to obtain a good rebound, durability, and spin rate-lowering effect on full shots.

In addition, an organosulfur compound may be included in the rubber composition so as to impart an excellent rebound. Thiophenols, thionaphthols, halogenated thiophenols, and metal salts thereof are recommended for this purpose. Illustrative examples include pentachlorothiophenol, pentafluorothiophenol, pentabromothiophenol, p-chlorothiophenol, and the zinc salt of pentachlorothiophenol; and also diphenylpolysulfides, dibenzylpolysulfides, dibenzoylpolysulfides, dibenzothiazoylpolysulfides and dithiobenzoylpolysulfides having 2 to 4 sulfurs. The use of diphenyldisulfide or the zinc salt of pentachlorothiophenol is especially preferred.

The amount of the organosulfur compound included per 100 parts by weight of the base rubber is at least 0.05 part by weight, preferably at least 0.07 part by weight, and more preferably at least 0.1 part by weight. The upper limit is not more than 5 parts by weight, preferably not more than 4 parts by weight, more preferably not more than 3 parts by weight, and most preferably not more than 2 parts by weight. Including too much organosulfur compound may excessively lower the hardness, whereas including too little is unlikely to improve the rebound.

Decomposition of the organic peroxide within the core formulation can be promoted by the direct addition of water (or a water-containing material) to the core material. It is known that the decomposition efficiency of the organic peroxide within the core-forming rubber composition changes with temperature and that, starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where water (or a water-containing material) is added directly to the core, because the water acts to promote decomposition of the organic peroxide, radical reactions like those described above can be made to differ at the core center and at the core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and the core surface differ markedly. It is also possible to obtain a core having different dynamic viscoelastic properties at the core center.

Along with achieving a lower spin rate, golf balls having such a core are also able to exhibit excellent durability and undergo little change over time in rebound.

The water included in the core material is not particularly limited, and may be distilled water or tap water. The use of distilled water which is free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content in the rubber composition prior to vulcanization becomes preferably at least 1,000 ppm, and more preferably at least 1,500 ppm. The upper limit is preferably not more than 8,500 ppm, and more preferably not more than 8,000 ppm. When the moisture content of the rubber composition is too low, it may be difficult to obtain a suitable crosslink density and tan δ, which may make it difficult to mold a golf ball having little energy loss and a reduced spin rate. On the other hand, when the moisture content of the rubber composition is too high, the core may end up too soft, which may make it difficult to obtain a suitable core initial velocity.

The core can be produced by vulcanizing and curing the rubber composition containing the above respective ingredients. For example, production may be carried out by kneading the composition using a mixer such as a Banbury mixer or a roll mill, compression molding or injection molding the kneaded composition using a core mold, and curing the molded material by suitably heating it at a temperature sufficient for the organic peroxide or co-crosslinking agent to act, i.e., from about 100° C. to about 200° C. for 10 to 40 minutes.

Next, the crosslink density of the core is described.

In this invention, the crosslink density at the center of the core is preferably at least $6.0 \times 10^2$ mol/m$^3$ and preferably not more than $15.0 \times 10^2$ mol/m$^3$. The crosslink density at the surface of the core is preferably at least $13.0 \times 10^2$ mol/m$^3$ and preferably not more than $30.0 \times 10^2$ mol/m$^3$. The difference in crosslink density between the core center and the core surface, expressed as (crosslink density at core surface)−(crosslink density at core center), is preferably at least $9.0 \times 10$ mol/m$^3$ and preferably not more than $30.0 \times 10^2$ mol/m$^3$. When the crosslink density at the core center or the core surface falls outside of the above range, the water within the rubber composition may not fully contribute to decomposition of the organic peroxide during vulcanization, as a result of which a sufficient spin rate-lowering effect on the ball may not be obtained.

The crosslink density can be measured as follows. A flat disk having a thickness of 2 mm is cut out by passing through the geometric center of the core. Using a punching machine, samples having a diameter of 3 mm are then punched from the flat disk at the core center and at places of measurement not more than 4 mm inward of respective sites corresponding to the core surface, and the sample weights are measured with an electronic balance capable of measurement in units of two decimal places (mg). The sample and 8 mL of toluene are placed in a 10 mL vial and the vial is closed with a stopper and left at rest for at least 72 hours, after which the solution is discarded and the sample weight following immersion is measured. Using the Flory-Rehner equation, the crosslink density of the rubber composition is calculated from the sample weights before and after swelling.

$$\nu = -(\ln(1-v_r) + v_r + \chi v_r^2)/V_s(v_r^{1/3} - v_r/2)$$

Here, $\nu$ is the crosslink density, $v_r$ is the volume fraction of rubber in the swollen sample, $\chi$ is an interaction coefficient, and $V_s$ is the molar volume of toluene.

$$v_r = V_{BR}/(V_{BR} + V_T)$$

$$V_{BR} = (w_f - w_f v_f)/\rho$$

$$V_T = (w_s - w_f)/\rho_T$$

$V_{BR}$ represents the volume of butadiene rubber in the rubber composition, $V_T$ is the volume of toluene in the swollen sample, $v_f$ is the weight fraction of filler in the rubber composition, p is the density of the rubber composition, $w_f$ is the sample weight before immersion, $w_s$ is the sample weight after immersion, and $\rho_T$ is the density of toluene.

Calculation is carried out at a Vs value of $0.1063 \times 10^{-3}$ m$^3$/mol and a $\rho_T$ value of 0.8669, and at a value for $\chi$, based on the literature (*Macromolecules* 2007, 40, 3669-3675), of 0.47.

The technical significance of the product P×E of the difference in crosslink density P (mol/m$^3$) between the core surface and the core center, expressed as (crosslink density at core surface)−(crosslink density at core center), multiplied by the deflection E (mm) of the core when compressed under a final load of 1,275 N (130 kgf) from an initial load state of 98 N (10 kgf) is as follows. Generally, as the core hardness becomes higher, i.e., as the core deflection E (mm) becomes smaller, this difference P (mol/m$^3$) in crosslink density tends to become larger. Therefore, by multiplying P by E in the above way, the influence of the core hardness can be canceled out, enabling the value P×E to serve as an indicator of the reduction in spin rate. The P×E value is preferably at least $26 \times 10^2$ mol/m$^3$-mm. As explained above, with the emergence of a difference in crosslink density between the core center and the core surface, a golf ball can be obtained which has a lower spin rate and a higher durability and which, moreover, even with use over an extended period of time, does not undergo a decline in initial velocity.

Next, the method of measuring the dynamic viscoelasticity of the core is explained.

Generally, the viscoelasticity of a rubber material is known to have a strong influence on the performance of rubber products. Also, with regard to the loss tangent (tan δ), which represents the ratio of energy lost to energy stored, it is known that a smaller tan δ is associated with a larger contribution by the elasticity component in rubber, and that a larger tan δ is associated with a larger contribution by the viscosity component. In this invention, in a dynamic viscoelasticity test on vulcanized rubber at the core center in which measurement is carried out at a temperature of −12° C. and a frequency of 15 Hz, letting tan $δ_1$ be the loss tangent at a dynamic strain of 1% and tan $δ_{10}$ be the loss tangent at a dynamic strain of 10%, the slope of these tan δ values, expressed as [(tan $δ_{10}$−tan $δ_1$)/(10%−1%)], is preferably not more than 0.003, and more preferably not more than 0.002. When the above tan δ values becomes larger, the energy loss by the core may become too large, which may make it difficult to obtain a satisfactory rebound and a spin rate-lowering effect. Various methods may be employed to measure the dynamic viscoelasticity performance of the core. In one such method, a circular disk having a thickness of 2 mm is cut out of the cover-encased core by passing through the geometric center thereof, following which, with this as the sample, a punching press is used to punch out a 3 mm diameter specimen at the place of measurement. In addition, by employing a dynamic viscoelasticity measuring apparatus (such as that available under the product name EPLEXOR 500N from GABO) and using a compression test holder, the tan δ values under dynamic strains of 0.01 to 10% can be measured at an initial strain of 35%, a measurement temperature of −12° C. and a frequency of 15 Hz, and the slope determined based on the results of these measurements.

Figure 2:
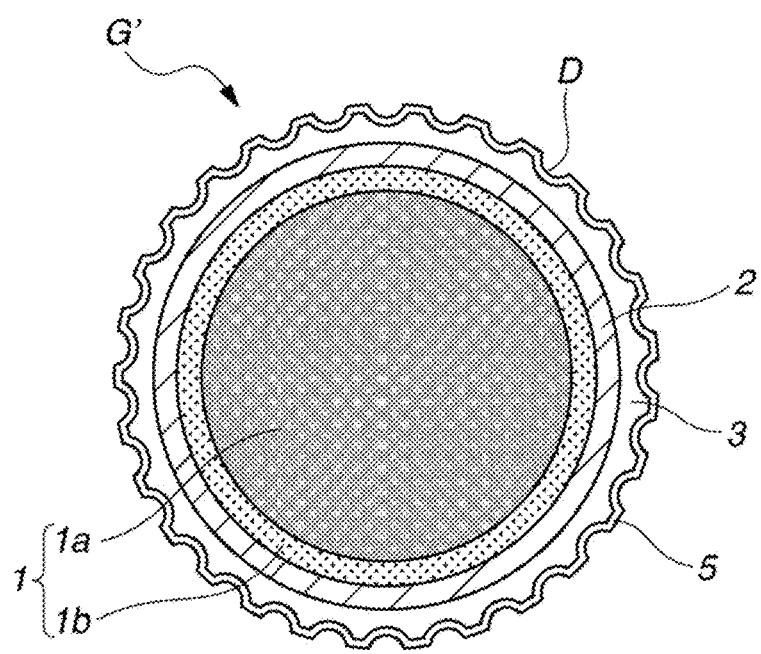
FIG. 2 is a schematic cross-sectional diagram of a golf ball according to another embodiment of the invention in which the core is formed as two layers.

In the golf ball of the invention, the core may be formed as a single layer or may be formed as two layers—an inner core layer and an outer core layer. For example, referring to FIG. 2, the golf ball G' may have a core 1 which is formed of an inner core layer 1a and an outer core layer 1b, an intermediate layer 2 and a cover 3 encasing the surface of this core, and a paint film layer 5 formed on the surface of the cover. As in FIG. 1, the reference symbol D represents dimples, a large number of which are formed on the surface of the cover 3.

When the core is formed into two layers—an inner core layer and an outer core layer, the inner core layer and outer core layer materials are each composed primarily of a rubber material. The rubber material for the outer core layer encasing the inner core layer may be of the same type as the inner core layer material or of a different type. The details are similar to those already given in connection with the various components making up the earlier described core rubber material.

In cases where the core is formed as two layers, the diameter of the inner core layer is preferably at least 20 mm, more preferably at least 22 mm, and even more preferably at least 23 mm. The upper limit is preferably not more than 30 mm, more preferably not more than 28 mm, and even more preferably not more than 26 mm.

When the diameter of the inner core layer is too small, a ball spin rate-lowering effect ceases to be exhibited; when the diameter is too large, the initial velocity of the ball when hit decreases, as a result of which the intended distance may not be achieved.

The outer core layer has a thickness of preferably at least 1 mm, more preferably at least 3 mm, and even more preferably at least 5 mm. The upper limit is preferably not more than 12 mm, more preferably not more than 10 mm, and even more preferably not more than 8 mm. When the thickness of the outer core layer falls outside of the above range, a spin rate-suppressing effect on full shots may not be fully obtained and so a good distance may not be achieved.

The method for producing the inner core layer and the outer core layer is not particularly limited. However, in accordance with customary practice, the inner core layer may be molded by a method such as that of forming the inner core layer material into a spherical shape under heating and compression at 140 to 180° C. for 10 to 60 minutes. The method used to form the outer core layer on the surface of the inner core layer may involve forming a pair of half-cups from unvulcanized rubber in sheet form, placing the inner core layer within these cups so as to encapsulate it, and then molding under applied heat and pressure. For example, suitable use can be made of a process wherein, following initial vulcanization (semi-vulcanization) to produce a pair of hemispherical cups, the inner core layer is placed in one of the hemispherical cups and then covered with the other hemispherical cup, in which state secondary vulcanization (complete vulcanization) is carried out. Alternatively, suitable use can be made of a process which divides vulcanization into two stages by rendering an unvulcanized rubber composition into sheet form so as to produce a pair of outer core layer-forming sheets, stamping the sheets using a hemispherical die provided thereon with protrusions to produce unvulcanized hemispherical cups, and subsequently covering a prefabricated inner core layer with a pair of these hemispherical cups and forming the whole into a spherical shape by heating and compression at 140 to 180° C. for 10 to 60 minutes.

Next, the intermediate layer is described.

The intermediate layer has a material hardness expressed in terms of Shore D hardness which, although not particularly limited, is preferably from 35 to 75, more preferably from 40 to 70, and even more preferably from 45 to 65. When the intermediate layer is too soft, the spin rate on full shots may rise excessively, as a result of which a good distance may not be achieved. On the other hand, when the intermediate layer is too hard, the feel of the ball on shots with a putter or on short approaches may become too hard.

The intermediate layer has a thickness of preferably from 0.9 to 2.4 mm, more preferably from 1.0 to 2.1 mm, and even more preferably from 1.1 to 1.8 mm. In this invention, it is preferable for the thickness of the intermediate layer to be larger than that of the subsequently described cover (outermost layer). When the intermediate layer thickness falls outside of this range or is smaller than the cover thickness, the spin rate-reducing effects on shots with a driver (W#1) may be inadequate, as a result of which a good distance may not be achieved.

The intermediate layer material is not particularly limited, although preferred use can be made of various thermoplastic resin materials. From the standpoint of fully achieving the desired effects of the invention, it is especially preferable to use a high-resilience resin material as the intermediate layer material. For example, the use of an ionomer resin material is preferred.

A commercial product may be used as the above resin. Illustrative examples include sodium-neutralized ionomers such as Himilan® 1605, Himilan® 1601 and AM7318 (all available from DuPont-Mitsui Polychemicals Co., Ltd.); zinc-neutralized ionomer resins such as Himilan® 1557, Himilan® 1706 and AM7317 (all available from DuPont-Mitsui Polychemicals Co., Ltd.); and the products available under the trade names HPF 1000, HPF 2000 and HPF AD1027, as well as the experimental material HPF SEP1264-3, all produced by E.I. DuPont de Nemours & Co. These may be used singly, or two or more may be used in combination.

A non-ionomeric thermoplastic elastomer may be included in the intermediate layer material. The non-ionomeric thermoplastic elastomer is preferably included in an amount of from 1 to 50 parts by weight per 100 parts by weight of the combined amount of the base resins.

The non-ionomeric thermoplastic elastomer is exemplified by polyolefin elastomers (including polyolefins and metallocene-catalyzed polyolefins), polystyrene elastomers, diene polymers, polyacrylate polymers, polyamide elastomers, polyurethane elastomers, polyester elastomers and polyacetals.

In addition, various additives may be optionally included in the intermediate layer-forming material. For example, pigments, dispersants, antioxidants, light-stabilizers, ultraviolet absorbers, parting agents and the like may be suitably included.

It is advantageous to abrade the surface of the intermediate layer in order to increase adhesion with the polyurethane that is preferably used in the subsequently described cover (outermost layer). In addition, it is desirable to apply a primer (adhesive) to the surface of the intermediate layer following such abrasion treatment or to add an adhesion reinforcing agent to the intermediate layer material.

In addition, an envelope layer may be formed between the core and the intermediate layer. The envelope layer material is exemplified by the same materials mentioned above for the intermediate layer material. The material used to form the envelope layer may be a resin material that is the same as or different from the intermediate layer material.

The envelope layer thickness and material hardness may be suitably selected from the ranges give above for the intermediate layer thickness and material hardness.

When the core is formed into two layers—an inner core layer and an outer core layer, it is desirable to optimize the relationship between the surface hardness of the inner core layer and the surface hardness of the sphere obtained by encasing the core (meaning the entire core consisting of the inner core layer and the outer core layer) with the intermediate layer. That is, the JIS-C hardness value obtained by subtracting the surface hardness of the inner core layer from the surface hardness of the intermediate layer-encased sphere is preferably at least 25, more preferably at least 27, and even more preferably at least 29; the upper limit is preferably not more than 50, more preferably not more than 45, and even more preferably not more than 40. When this value is too small, a spin rate-lowering effect may not be exhibited and so the intended distance may not be obtained. When this value is too large, the durability may worsen.

Next, the cover, which is the outermost layer of the ball, is described.

The cover (outermost layer) has a material hardness expressed in terms of Shore D hardness which, although not particularly limited, is preferably from 25 to 57, more preferably from 27 to 55, and even more preferably from 29 to 53.

The cover (outermost layer) has a thickness which, although not particularly limited, is preferably from 0.3 to 1.5 mm, more preferably from 0.4 to 1.2 mm, and even more preferably from 0.5 to 1.0 mm. When the cover is thicker than this range, the rebound on W#1 shots and iron shots may be inadequate and the spin rate may rise, as a result of which a good distance may not be obtained. On the other hand, when the cover is thinner than this range, the ball may lack spin receptivity on approach shots, resulting in poor controllability.

The cover (outermost layer) material is not particularly limited, although the use of any of various thermoplastic resin materials or thermoset materials is preferred. For reasons having to do with controllability and scuff resistance, it is preferable to use a urethane resin as the cover material in this invention. In particular, from the standpoint of the mass productivity of manufactured golf balls, it is preferable to use a cover material composed primarily of polyurethane. This is described in detail below.

Polyurethane

The thermoplastic polyurethane material has a structure which includes soft segments composed of a polymeric polyol that is a long-chain polyol (polymeric glycol), and hard segments composed of a chain extender and a polyisocyanate. Here, the polymeric polyol serving as a starting material is not subject to any particular limitation, and may be any that is used in the prior art relating to thermoplastic polyurethane materials. Exemplary polymeric polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Illustrative examples of polyester polyols include adipate-based polyols such as polyethylene adipate glycol, polypropylene adipate glycol, polybutadiene adipate glycol and polyhexamethylene adipate glycol; and lactone-based polyols such as polycaprolactone polyol. Illustrative examples of polyether polyols include poly(ethylene glycol), poly(propylene glycol), poly(tetramethylene glycol) and poly(methyltetramethylene glycol). These may be used singly or as a combination of two or more thereof.

The number-average molecular weight of these long-chain polyols is preferably in the range of 1,000 to 5,000. By using a long-chain polyol having such a number-average molecular weight, golf balls made with a thermoplastic polyurethane composition having excellent properties such as the above-mentioned resilience and productivity can be reliably obtained. The number-average molecular weight of the long-chain polyol is more preferably in the range of 1,500 to 4,000, and even more preferably in the range of 1,700 to 3,500.

Here, and below, "number-average molecular weight" refers to the number-average molecular weight calculated based on the hydroxyl value measured in accordance with JIS K-1557.

The chain extender is not particularly limited, although preferred use may be made of those employed in the prior art relating to thermoplastic polyurethanes. A low-molecular-weight compound which has a molecular weight of 2,000 or less and bears on the molecule two or more active hydrogen atoms capable of reacting with isocyanate groups may be used, with the use of an aliphatic diol having from 2 to 12 carbons being preferred. Specific examples of the chain extender include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

The polyisocyanate is not subject to any particular limitation, although preferred use may be made of those employed in the prior art relating to thermoplastic polyurethanes. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. Depending on the type of isocyanate used, the crosslinking reaction during injection molding may be difficult to control.

Although not an essential ingredient, a thermoplastic resin or elastomer other than a thermoplastic polyurethane may also be included. More specifically, use may be made of one or more selected from among polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of polyester elastomers, polyamide elastomers and polyacetals is especially preferred because these increase the resilience and scuff resistance due to reaction with the isocyanate groups while yet maintaining a good productivity. When these ingredients are included, the content thereof is suitably selected so as to, for example, adjust the cover material hardness, improve the resilience, improve the flow properties or improve adhesion. The content of these ingredients, although not particularly limited, may be set to preferably at least 5 parts by weight per 100 parts by weight of the thermoplastic polyurethane component. Although there is no particular upper limit, the content per 100 parts by weight of the thermoplastic polyurethane component may be set to preferably not more than 100 parts by weight, more preferably not more than 75 parts by weight, and even more preferably not more than 50 parts by weight.

The ratio of active hydrogen atoms to isocyanate groups in the above polyurethane-forming reaction may be adjusted within a desirable range so as to make it possible to obtain golf balls which are made with a thermoplastic polyurethane composition and have various improved properties, such as rebound, spin performance, scuff resistance and productivity.

Specifically, in preparing a thermoplastic polyurethane by reacting the above long-chain polyol, polyisocyanate compound and chain extender, it is desirable to use the respective components in proportions such that the amount of isocyanate groups included in the polyisocyanate compound per mole of active hydrogen atoms on the long-chain polyol and the chain extender is from 0.95 to 1.05 moles.

A commercial product may be suitably used as the above thermoplastic polyurethane material. Illustrative examples include the products available under the trade name "Pandex" from DIC Bayer Polymer, Ltd., and the products available under the trade name "Resamine" from Dainichiseika Color & Chemicals Mfg. Co., Ltd.

Treatment of Cover Surface

Next, in the golf ball of the invention, the surface of the outermost cover layer molded as described above may be treated with a polyisocyanate compound that is free of organic solvent. The method of carrying out this surface treatment is described below.

This treatment method uses a polyisocyanate compound that is free of organic solvent. The polyisocyanate compound, although not particularly limited, is typically selected from the following group.

<Group of Isocyanate Compounds for Selection>

The group consisting of tolylene-2,6-diisocyanate, tolylene-2,4-diisocyanate, 4,4'-diphenylmethane diisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives of these, and prepolymers formed of such polyisocyanate compounds.

The polyisocyanate compound is preferably an aromatic polyisocyanate compound, with the use of 4,4'-diphenylmethane diisocyanate (monomeric (i.e., pure) MDI) or polymethylene polyphenyl polyisocyanate (polymeric MDI) being especially preferred. When an aromatic polyisocyanate compound is used in the invention, because it has a high reactivity with the reactive groups on the thermoplastic resin, the intended effects can be successfully achieved. The use of polymeric MDI is preferred because it has a larger number of isocyanate groups than monomeric MDI and thus provides a large scuff resistance-improving effect due to crosslink formation, and moreover because it is in a liquid state at normal temperatures and thus has an excellent handleability. However, polymeric MDI generally has a dark brown appearance, which may discolor and stain the cover material to be treated. Because such discoloration is conspicuous when treatment is carried out with polymeric MDI in the form of a solution obtained by dissolution in an organic solvent, owing to concern over such discoloration, in the practice of this invention the polymeric MDI is used in a state that is free of organic solvents.

The preliminary treatments described in, for example, JP 4114198 and JP 4247735 may be suitably used as methods for reducing discoloration by polymeric MDI. Although the techniques described in these patent publications may be adopted for use here, the possibilities are not limited to these techniques alone. When such preliminary treatment is carried out and the treatment is followed by suitable washing, substantially no discoloration arises.

Dipping, coating (spraying), infiltration under applied heat and pressure, dropwise addition method or the like may be suitably used as the method of treatment with the polyisocyanate compound. From the standpoint of process control and productivity, the use of a dipping or coating method is especially preferred. The length of treatment by dipping is preferably from 1 to 180 minutes. When the treatment time is too short, a sufficient crosslinking effect is difficult to obtain. On the other hand, when the treatment time is too long, there is a possibility of substantial discoloration of the cover surface by excess polyisocyanate compound. Also, with a long treatment time, the production lead time becomes long, which is rather undesirable from the standpoint of productivity. As for the temperature during such treatment, from the standpoint of productivity, it is preferable to control the temperature within a range that allows a stable molten liquid state to be maintained and also allows the reactivity to be stably maintained. The temperature is preferably from 10 to 60° C. If the treatment temperature is too low, infiltration and diffusion to the cover material or reactivity at the surface layer interface may be inadequate, as a result of which the desired properties may not be achieved. On the other hand, if the treatment temperature is too high, infiltration and diffusion to the cover (outermost layer) material or reactivity at the surface layer interface may increase and there is a possibility of greater discoloration of the cover (outermost layer) surface on account of excess polyisocyanate compound. Also, in cases where the ball appearance—including the shapes of the dimples—changes, or an ionomeric material is used in part of the golf ball, this may give rise to changes in the physical properties of the ball. By carrying out treatment for a length of time and at a temperature in these preferred ranges, it is possible to obtain a sufficient crosslinking effect and, in turn, to achieve the desired ball properties without a loss of productivity.

When excess polyisocyanate compound remains on the ball surface following the above treatment, this tends to cause adverse effects such as logo mark transfer defects and the peeling of paint, and moreover may lead to appearance defects such as discoloration over time. Hence, it is preferable to wash the ball surface with a suitable organic solvent. Particularly in cases where polymeric MDI is used, because this compound is a dark brown-colored liquid, unless the ball surface is thoroughly washed, appearance defects may end up arising. The organic solvent used at this time should be suitably selected from among organic solvents that dissolve the polyisocyanate compound and do not dissolve the polyurethane serving as a component of the cover (outermost layer) material. Preferred use can be made of organic solvents such as esters, ketones, as well as other suitable organic solvents such as benzene, dioxane or carbon tetrachloride which dissolve the polyisocyanate compound. In particular, acetone, ethyl acetate, methyl ethyl ketone, methyl isobutyl ketone, toluene or xylene, either alone or in admixture, may be suitably used as the organic solvent, although the choices are not necessarily limited to these. Washing with the organic solvent may be carried out by an ordinary method. For example, use may be made of dipping, shaking, ultrasound, microbubbles or nanobubbles, a submerged jet or a shower.

Drying treatment may be carried out preliminary to surface treatment with the polyisocyanate compound. That is, when treating the cover (outermost layer), to remove moisture contained in the cover (outermost layer) material and thereby stabilize the physical properties following treatment and increase the life of the treatment solution, it may be desirable to carry out, as needed, drying treatment or the like beforehand, although this is not always the case. A common method such as warm-air drying or vacuum drying may be used as the drying treatment.

Following surface treatment with the polyisocyanate compound, it is desirable to provide a suitable curing step in order both to have the crosslinking reactions between the polyurethane and the polyisocyanate compound effectively proceed, thereby enhancing and stabilizing the physical properties and quality, and also to control and shorten the production takt time. Specifically, it is preferable to carry out heating treatment under suitable temperature and time conditions that are typically from 15 to 150° C. for up to 24 hours.

The pickup of polyisocyanate compound following surface treatment can be suitably adjusted according to the weight and desired properties of the golf ball as a whole. This pickup, expressed in terms of weight change, is preferably in the range of 0.01 to 1.0 g. When the weight change is too small, impregnation by the polyisocyanate compound may be inadequate and suitable property enhancing effects may not be obtained. When the weight change is too large, control of the ball weight within a range that conforms to the rules for golf balls and various types of control, including of dimple changes, may be difficult. With regard to the depth of impregnation by the polyisocyanate compound, the process conditions may be suitably selected so as to obtain the desired physical properties. Modification by such an approach has the effect of, given that the polyisocyanate compound penetrates and disperses from the surface, making it easy to impart a gradient in the physical properties. Imparting a physical property gradient within a cover layer having some degree a thickness simulates, and indeed serves the same purpose as, providing a cover layer that is itself composed of multiple layers, thus making it possible to achieve cover characteristics that never before existed. The state of impregnation by the polyisocyanate compound may vary depending on whether an organic solvent is present. When an organic solvent is used, changes in the physical properties can be achieved to a greater depth; when an organic solvent is not used, changes in the physical properties are easily imparted at positions closer to the interface. When treatment is carried out by a method that does not use an organic solvent, the physical properties near the surface of the outermost cover layer and the physical properties at the cover interior are easily differentiated, which has the advantage of enabling a greater degree of freedom in golf ball design to be achieved.

In addition, various additives may be optionally included in the cover resin material. For example, pigments, dispersants, antioxidants, light stabilizers, ultraviolet absorbers, parting agents and the like may be suitably included.

The manufacture of multi-piece solid golf balls in which the above-described core, intermediate layer and cover (outermost layer) are formed as successive layers may be carried out by a customary method such as a known injection-molding process. For example, a multi-piece golf ball may be obtained by placing, as the core, a molded and vulcanized product composed primarily of a rubber material in a given injection mold, injecting an intermediate layer-forming material over the core to give an intermediate sphere, and subsequently placing the resulting sphere in another injection mold and injection-molding a cover (outermost layer)-forming material over the sphere. Alternatively, a cover may be formed over the intermediate layer by a method that involves encasing the intermediate sphere with a cover (outermost layer), this being carried out by, for example, enclosing the intermediate sphere within two half-cups that have been pre-molded into hemispherical shapes, and then molding under applied heat and pressure.

In the golf ball of the invention, for reasons having to do with aerodynamic performance, numerous dimples may be provided on the surface of the outermost layer. The number of dimples formed on the surface of the outermost layer is not particularly limited. However, to enhance the aerodynamic performance and increase the distance traveled by the ball, this number is preferably at least 250, more preferably at least 270, even more preferably at least 290, and most preferably at least 300. The upper limit is preferably not more than 400, more preferably not more than 380, and even more preferably not more than 360.

In this invention, a paint film layer is formed on the cover surface. A two-part curable urethane paint may be suitably used as the paint that forms the paint film layer. Specifically, in this case, the two-part curable urethane paint includes a base resin composed primarily of a polyol resin and a curing agent composed primarily of a polyisocyanate.

A known method may be used without particular limitation as the method of applying this paint onto the cover surface and forming a paint film layer. Use can be made of a desired method such as air gun painting or electrostatic painting.

The thickness of the paint film layer, although not particularly limited, is generally from 8 to 22 μm, and preferably from 10 to 20 μm.

The paint film layer has an elastic work recovery of preferably 30 to 98%, and more preferably 70 to 90%. When the elastic work recovery of the paint film layer is within the above range, the paint film formed on the golf ball surface has a high self-repairing ability while maintaining a certain hardness and elasticity and is thus able to contribute to excellent ball durability and scuff resistance. When the elastic work recovery of this paint film layer falls outside of the above range, a sufficient spin rate on approach shots may not be attainable. The method of measuring this elastic work recovery is subsequently described.

The elastic work recovery is one parameter of the nanoindentation method for evaluating the physical properties of paint films, which is a nanohardness test method that controls the indentation load on a micro-newton (μN) order and tracks the indenter depth during indentation to a nanometer (nm) precision. In prior methods, only the size of the deformation (plastic deformation) mark corresponding to the maximum load could be measured. However, in the nanoindentation method, the relationship between the indentation load and the indentation depth can be obtained by continuous automated measurement. Hence, unlike in the past, there are no individual differences between observers when visually measuring a deformation mark under an optical microscope, which presumably enables the physical properties of the paint film to be evaluated reliably and to a high precision. Hence, given that the paint film on the golf ball surface is strongly affected by the impact of drivers and various other clubs and has a not inconsiderable influence on various golf ball properties, measuring the golf ball paint film by the nanohardness test method and carrying out such measurement to a higher precision than in the past is a very effective method of evaluation.

The golf ball on which a paint film layer has thus been formed on the cover surface has a dynamic coefficient of friction of preferably from 0.300 to 0.430, and more preferably from 0.350 to 0.400. The dynamic coefficient of friction here is the coefficient of friction between the golf ball and an impact plate sloped at a given angle when the ball is made to collide with the plate, and is measured with a contact force tester. For a detailed explanation of this contact force tester, reference can be made to the substantially identical tester described in JP-A 2013-176530. In this invention, the dynamic coefficient of friction is measured by dropping the ball from a height of 90 cm and causing it to collide with the impact plate at an angle of 20°. The angle at which the ball is made to collide with the impact plate is set to 20° in order to represent an open face on an iron club used on an approach shot.

The dynamic coefficient of friction is calculated from the following formula.

Dynamic coefficient of friction=contact force (shear direction)/contact force (launch direction)

The spin rate on an approach shot is closely associated with the cover hardness and the paint film hardness, and also is strongly correlated with the dynamic coefficient of friction of the golf ball. Hence, to obtain the optimal spin rate on an approach shot, as will be explained later in this Specification, it is essential to optimize a spin index that is based on the dynamic coefficient of friction for the golf ball.

In this invention, letting (Ho−H12)−(H12−Hc) in above condition (3) of the core hardness profile be A, the spin index of the ball, defined as the dynamic coefficient of friction for the ball multiplied by A, must be at least 3.0. By making this spin index 3.0 or larger, it is possible both to reduce the spin rate on full shots with a driver (W#1) and also to achieve a suitable spin rate on approach shots. The spin index is preferably 3.5 or more, and more preferably 4.0 or more.

The technical significance of multiplying the dynamic coefficient of friction for the ball by A lies in providing an indicator of the degree to which the contradictory attributes of increased distance due to a reduced spin rate on full shots and increased control performance on approach shots can both be attained, thus serving to achieve the desired effect in this invention of improving the overall performance over that of conventional golf balls.

The inventive golf ball has a diameter of at preferably least 42 mm, more preferably at least 42.3 mm, and even more preferably at least 42.6 mm. The upper limit is preferably not more than 44 mm, more preferably not more than 43.8 mm, even more preferably not more than 43.5 mm, and still more preferably not more than 43 mm.

The golf ball has a weight of preferably at least 44.5 g, more preferably at least 44.7 g, even more preferably at least 45.1 g, and most preferably at least 45.2 g. The upper limit is preferably not more than 47.0 g, more preferably not more than 46.5 g, and even more preferably not more than 46.0 g.

The deflection of the golf ball under an applied load, that is, the deflection of the ball when compressed under a final load of 1,275 N (130 kgf) from an initial load of 98 N (10 kgf), has a lower limit of preferably at least 1.8 mm, more preferably at least 2.0 mm, and even more preferably at least 2.2 mm. The upper limit is preferably not more than 3.8 mm, more preferably not more than 3.6 mm, and even more preferably not more than 3.4 mm. When the ball deflection is too small, the feel at impact may worsen markedly or the spin rate may rise excessively, as a result of which the desired distance may not be achieved. Conversely, when the deflection is too large, the initial velocity may be poor or the durability may be greatly compromised.

It should be noted that the deflection of the golf ball under a given applied load refers here to the measured deflection for a completed golf ball having a paint film layer formed on the surface of the cover (outermost layer).

As described above, golf ball of the invention suppresses the spin rate on full shots and thus has an ability to maintain a straight trajectory, and moreover exhibits a satisfactory spin performance on approach shots. Hence, the performance is enhanced over that of conventional golf balls, enabling the inventive ball to satisfy at a high level the distance and control performance relied on by professional golfers and skilled amateurs.

EXAMPLES

The following Working Examples and Comparative Examples are provided to illustrate the invention, and are not intended to limit the scope thereof.

Working Examples 1 to 6, Comparative Examples 1 to 4

Formation of Core

Solid cores were produced by preparing the rubber compositions for the respective Working Examples and Comparative Examples shown in Table 1, then vulcanizing and molding the compositions under the vulcanization conditions shown in Table 1.

TABLE 1

| Core formulations | Working Example | | | | | | Comparative Example | | | |
|---|---|---|---|---|---|---|---|---|---|---|
| (pbw) | 1 | 2 | 3 | 4 | 5 | 6 | 1 | 2 | 3 | 4 |
| Polybutadiene (1) | 80 | 80 | 80 | 80 | 80 | 80 | 80 | 80 | 80 | 80 |
| Polybutadiene (2) | 20 | 20 | 20 | 20 | 20 | 20 | 20 | 20 | 20 | 20 |
| Organic peroxide (1) | 1.0 | 0.6 | 1.0 | 1.0 | 1.0 | 1.0 | 1.0 | 1.0 | | |
| Organic peroxide (2) | | | | | | | | | 2.5 | 2.5 |
| Barium sulfate (I) | | | | | | | | | 18.0 | 18.8 |
| Barium sulfate (II) | 9.3 | 8.6 | 16.5 | 11.0 | 17.4 | 17.4 | 20.8 | 21.8 | | |
| Zinc oxide | 4 | 4 | 4 | 4 | 4 | 4 | 4 | 4 | 4 | 4 |
| Antioxidant | | 0.1 | | | 0.1 | 0.1 | 0.1 | | 0.1 | 0.1 |
| Zinc acrylate | 43 | 44 | 38 | 38 | 31 | 31 | 33 | 31 | 27 | 25 |

TABLE 1-continued

| Core formulations (pbw) | Working Example 1 | 2 | 3 | 4 | 5 | 6 | Comparative Example 1 | 2 | 3 | 4 |
|---|---|---|---|---|---|---|---|---|---|---|
| Water | 1.00 | 0.80 | 1.00 | 0.80 | 0.80 | 0.80 | 0.40 | 0.40 | 0.05 | 0.05 |
| Zinc salt of pentachlorothiophenol | 0.3 | 0.3 | 0.5 | 0.3 | 0.6 | 0.6 | 0.3 | 0.3 | 0.4 | 0.4 |
| Vulcanization temperature (° C.) | 155 | 155 | 155 | 155 | 155 | 155 | 155 | 155 | 155 | 155 |
| Vulcanization time (min) | 15 | 15 | 15 | 15 | 15 | 15 | 13 | 13 | 13 | 13 |

Details on each of the ingredients in Table 1 are given below.

Polybutadiene (1): Available under the trade name "BR 01" from JSR Corporation
Polybutadiene (2): Available under the trade name "BR 51" from JSR Corporation
Organic peroxide (1): Dicumyl peroxide, available under the trade name "Percumyl D" from NOF Corporation
Organic peroxide (2): A mixture of 1,1-di(t-butylperoxy)cyclohexane and silica, available under the trade name "Percumyl C-40" from NOF Corporation
Barium sulfate (I): Available under the trade name "Precipitated Barium Sulfate 100" from Sakai Chemical Co., Ltd.
Barium sulfate (II): Available under the trade name "Barico #100" from Hakusui Tech
Zinc oxide: Available under the trade name "Zinc Oxide Grade 3" from Sakai Chemical Co., Ltd.
Antioxidant: 2,2-Methylenebis(4-methyl-6-butylphenol), available under the trade name "Nocrac NS-6" from Ouchi Shinko Chemical Industry Co., Ltd.
Zinc acrylate: Available from Nippon Shokubai Co., Ltd.
Water: Distilled water, from Wako Pure Chemical Industries, Ltd.
Zinc salt of pentachlorothiophenol: Available from Wako Pure Chemical Industries, Ltd.

Formation of Envelope Layer and Intermediate Layer

Next, in Working Examples 1, 2 and 4 to 6 and in Comparative Examples 3 and 4, an intermediate layer material formulated as shown in Table 2 was injection-molded over the core to form an intermediate layer, thereby giving an intermediate layer-encased sphere. In Working Example 3 and Comparative Examples 1 and 2, an envelope layer material formulated as shown in Table 2 was injection-molded over the core to form an envelope layer, after which an intermediate layer material formulated as shown in the same table was injection-molded over the envelope layer to form an intermediate layer, thereby giving an envelope layer and intermediate layer-encased sphere.

Formation of Cover (Outermost Layer)

Next, in each of the Working Examples and Comparative Examples, a cover material formulated as shown in Table 2 was injection-molded over the intermediate layer-encased sphere obtained as described above, thereby forming a cover (outermost layer). At this time, a plurality of specific dimples common to all the Working Examples and Comparative Examples were formed on the surface of the cover.

TABLE 2

| Resin formulation (pbw) | I | II | III | IV | V | VI | VII |
|---|---|---|---|---|---|---|---|
| HPF1000 | 100 | | | | | | |
| Himilan ® 1605 | | 50 | | | | | |
| Himilan ® 1557 | | 15 | | | | | |
| Himilan ® 1706 | | 35 | | | | | |
| AN4319 | | | 20 | | | | |
| AN4221C | | | 80 | | | | |
| Magnesium stearate | | | 60 | | | | |
| Calcium hydroxide | | | 1.5 | | | | |
| Trimethylolpropane | | 1.1 | | | | | |
| Polytail H | | 8 | | | | | |
| T-8260 | | | | | 25 | | |
| T-8295 | | | | 50 | 75 | | |
| T-8290 | | | | 50 | | 40 | 75 |
| T-8283 | | | | | | 60 | 25 |
| Magnesium oxide | | | 1 | | | | |
| Titanium oxide | | | | 2.4 | 2.4 | 2.4 | 2.4 |
| Polyethylene wax | | | | 1 | 1 | 1 | 1 |

Details on the materials shown in Table 2 are as follows.
HPF1000: An ionomer available from E.I. DuPont de Nemours & Co.
Himilan®: Ionomers available from DuPont-Mitsui Polychemicals Co., Ltd.
AN4319, AN4221C: Nucrel® resins available from DuPont-Mitsui Polychemicals Co., Ltd.
Magnesium stearate: Available under the trade name "Magnesium Stearate G" from NOF Corporation
Calcium hydroxide: Available under the trade name "Calcium Hydroxide CLS-B" from Shiraishi Calcium Kaisha, Ltd.
Trimethylolpropane: Available from Mitsubishi Gas Chemical Co., Inc.
Polytail H: A low-molecular-weight polyolefin polyol available from Mitsubishi Chemical Corporation
T-8260, T-8295, T-8290, T-8283: MDI-PTMG type thermoplastic polyurethanes available from DIC Bayer Polymer under the trademark Pandex.
Magnesium oxide: Available under the trade name "Kyowamag MF 150" from Kyowa Chemical Industry Co., Ltd.
Titanium oxide: Tipaque R680, from Ishihara Sangyo Kaisha, Ltd.
Polyethylene wax: Available under the trade name "Sanwax 161P" from Sanyo Chemical Industries, Ltd.

Treatment of Cover Surface Next, in each of the Working Examples and Comparative Examples, the cover was surface-treated with a polyisocyanate compound by carrying out the following steps (1) to (4) on the cover surface.
(1) Preliminary warming:
Carried out for 30 minutes at a temperature of 45 to 55° C.
(2) Dipping treatment with isocyanate compound:
Carried out for 20 to 40 minutes at a temperature of 45 to 55° C. The isocyanate compound used was polymeric MDI available from Sumika Bayer Urethane Co., Ltd.

under the trade name "Sumidur p-MDI 44V20L" (medium-viscosity type; solvent was not used).
(3) Washing: Washed with acetone.
(4) Curing:
Carried out for 360 minutes at a temperature of 45 to 55° C.

Formation of Paint Film Layer

Next, a paint formulated as shown in Table 3 below was applied with an air spray gun onto the cover (outermost layer) surface on which numerous dimples had been formed, thereby producing a golf ball having a 15 μm thick paint film layer formed thereon.

TABLE 3

| | | Paint formulation (pbw) | |
|---|---|---|---|
| | | A | B |
| Base resin | Polyol 1 | 100.0 | |
| | Polyol 2 | | 100.0 |
| | Ethyl acetate | 60.0 | 100.0 |
| | Propylene glycol monomethyl ether acetate | 40.0 | 40.0 |
| | Curing catalyst | 0.03 | 0.03 |
| Curing agent | Isocyanurate form of hexamethylene diisocyanate (1) | 52.5 | 30.5 |
| | Polyester-modified hexamethylene diisocyanate (2) | | 46.8 |
| | Ethyl acetate | 47.5 | 42.7 |
| | Molar compounding ratio (NCO/OH) | 1.08 | 1.08 |

Paint formulation B (NCO molar ratio): (1):(2) = 0.79:0.29

Synthesis Examples for Acrylic Polyols 1 and 2 in Table 3 are described below. Here, all parts are given by weight.

Acrylic Polyol Synthesis Example 1

A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 620 parts of polyester-containing acrylic monomer (Placcel® FM-3, from Daicel Chemical Industries, Ltd.), 317 parts of methyl methacrylate, 63 parts of 2-hydroxyethyl methacrylate and 12 parts of 2,2'-azobisisobutyronitrile was added dropwise over 4 hours. After the end of dropwise addition, the reaction was effected for 6 hours at the same temperature. Following reaction completion, 532 parts of butyl acetate and 520 parts of polycaprolactone diol (Praccel® L205AL, from Daicel Chemical Industries, Ltd.) were charged and mixed in, giving a clear acrylic polyol resin solution (Polyol 1) having a solids content of 50%, a viscosity of 600 mPa·s (25° C.), a weight-average molecular weight of 70,000, and a hydroxyl value of 142 mgKOH/g (solids).

Acrylic Polyol Synthesis Example 2

A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 220 parts of polyester-containing acrylic monomer (Placcel® FM-3, from Daicel Chemical Industries, Ltd.), 610 parts of methyl methacrylate, 170 parts of 2-hydroxyethyl methacrylate and 30 parts of 2,2'-azobisisobutyronitrile was added dropwise over 4 hours. After the end of dropwise addition, the reaction was effected for 6 hours at the same temperature. Following reaction completion, 180 parts of butyl acetate and 150 parts of polycaprolactone diol (Praccel L205AL, from Daicel Chemical Industries, Ltd.) were charged and mixed in, giving a clear acrylic polyol resin solution (Polyol 2) having a solids content of 50%, a viscosity of 100 mPa·s (25° C.), a weight-average molecular weight of 10,000, and a hydroxyl value of 113 mgKOH/g (solids).

The following measurements and evaluations were carried out on the golf balls thus obtained. The results are shown in Table 4.

Diameters of Core, Envelope Layer-Encased Sphere, Intermediate Layer-Encased Sphere The diameters at five random places on the surface were measured at a temperature of 23.9±1C and, using the average of these measurements as the measured value for a single core, envelope layer-encased sphere or intermediate layer-encased sphere, the average diameters for, respectively, five measured cores, five envelope layer-encased spheres or five intermediate layer-encased spheres specimens were determined.

Ball Diameter

The diameters at five random dimple-free areas were measured at a temperature of 23.9±1C and, using the average of these measurements as the measured value for a single ball, the average diameter for five balls was determined.

Deflections of Core and Ball

A core or ball was placed on a hard plate and the amount of deflection (mm) of each sphere when compressed under a final load of 1,275 N (130 kgf) from an initial load of 98 N (10 kgf) was measured. The amount of deflection here refers in each case to the measured value obtained after holding the test specimen isothermally at 23.9° C.

Core Hardness Profile

The indenter of a durometer was set so as to be substantially perpendicular to the spherical surface of the core, and the core surface hardness in terms of JIS-C hardness was measured as specified in JIS K6301-1975.

To obtain the cross-sectional hardnesses at the center and other specific positions of the core, the core was hemispherically cut so as form a planar cross-section and measurements were carried out by pressing the indenter of a durometer perpendicularly against the cross-section at the measurement positions. These hardnesses are indicated as JIS-C hardness values.

Material Hardnesses of Envelope Layer, Intermediate Layer and Cover (Shore D Hardnesses)

The envelope layer, intermediate layer and cover-forming resin materials were molded into sheets having a thickness of 2 mm and left to stand for at least two weeks, following which their Shore D hardnesses were measured in accordance with ASTM D2240-95.

Elastic Work Recovery of Paint Film Layer

The elastic work recovery of the paint was measured using a paint film sheet having a thickness of 100 μm. The ENT-2100 nanohardness tester from Erionix Inc. was used as the measurement apparatus, and the measurement conditions were as follows.

Indenter: Berkovich indenter
(material: diamond; angle α: 65.030)
Load F: 0.2 mN
Loading time: 10 seconds
Holding time: 1 second
Unloading time: 1 second The elastic work recovery was calculated as follows based on the indentation work $W_{elast}$ (Nm) due to spring-back deformation of the paint film, and on the mechanical indentation work $W_{total}$ (Nm).

Elastic work recovery=$W_{elast}/W_{total}\times 100(\%)$

Dynamic Coefficient of Friction for Ball

The dynamic coefficient of friction for the ball was measured using an apparatus that is substantially the same as the contact force testing device described in JP-A 2013-176530.

(I) Measurement Apparatus Specifications
  (A) Launcher:
    Drops ball from a specified height
    (90 cm in this case)
  (B) Impact Plate:
    Constructed of a base plate, a surface layer plate and a pressure sensor. The base plate is made of steel and has a thickness of 15 mm. The surface layer plate is made of stainless steel (SUS-630) and is 80 mm×80 mm×20 mm in size. The surface layer material which is positioned on the outside of the surface layer plate and serves as the striking surface of the impact plate is made of a titanium alloy, is not grooved, and has an average roughness Ra of 0.146 m and a maximum height Ry of 1.132 μm. A Kistler 3-component sensor (model 9067 force sensor) was used as the pressure sensor. A Kistler type 5011B charge amplifier was used. The slope angle (angle of impact plate with respect to dropping direction) was 200
(II) Measurement Procedure Measurement of the dynamic coefficient of friction was carried out by the following procedure.
  (II-a) Setting the angle (a) of the impact plate to 200 (angle of impact plate with respect to dropping direction).
  (II-b) Dropping the golf ball from the launcher.
  (II-c) Measuring the launch direction contact force Fn (t) and the shear direction contact force Ft (t), and calculating the maximum value of Ft (t)/Fn (t).

Spin Index of Ball

The spin index shown below in Table 4 is defined as the value obtained by multiplying the "Hardness difference (2)–Hardness difference (1)" value (i.e., the "(Ho–H12)–(H12–Hc)" value) in the core hardness profile of Table 4 by the ball dynamic coefficient of friction determined as described above.

The flight performance (W#1) and spin performance on approach shots of the golf balls obtained in the respective Working Examples and Comparative Examples were evaluated according to the criteria shown below. The results are presented in Table 5.

Initial Velocity

The initial velocity was measured using an initial velocity measuring apparatus of the same type as the USGA drum rotation-type initial velocity instrument approved by the R&A. The core was tested in a chamber at a room temperature of 23.9±2° C. after being held isothermally in a 23.91° C. environment for at least 3 hours. Each ball was hit using a 250-pound (113.4 kg) head (striking mass) at an impact velocity of 143.8 ft/s (43.83 m/s). One dozen balls were each hit four times. The time taken for the ball to traverse a distance of 6.28 ft (1.91 m) was measured and used to compute the initial velocity (m/s). This cycle was carried out over a period of about 15 minutes.

Flight Performance

The distance of the balls when struck at a head speed (HS) of 50 m/s with a driver (W#1) mounted on a golf swing robot was measured, and the flight performance was rated according to the following criteria. The club used was a TourStage X-Drive 709 D430 driver (2013 model) manufactured by Bridgestone Sports Co., Ltd. The loft angle on this driver was 9.50. The spin rate was measured using the Science Eye Field launch monitor system manufactured by Bridgestone Sports Co., Ltd.

Evaluation Criteria
  Good: Total distance was 264 m or more
  NG: Total distance was less than 264 m Spin Performance on Approach Shots The spin rate of the golf ball was measured with an imaging device at the same time as measurement of the dynamic coefficient of friction described above. That is, as described above under "Dynamic Coefficient of Friction for Ball," the ball was dropped from a height of 90 cm onto an impact plate and the spin rate following impact was measured. The spin rate was rated according to the following criteria. The initial velocity of the ball following impact was about 3.5 to 4.5 m/s, which corresponds to the general club head speed for obtaining a distance of 6 to 7 yards on an approach shot with a sand wedge.

Evaluation Criteria
  Good: Spin rate was 1,200 rpm or more
  NG: Spin rate was less than 1,200 rpm

TABLE 4

| | | Working Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Ball | Dynamic coefficient of friction | 0.324 | 0.324 | 0.391 | 0.383 | 0.302 | 0.362 | 0.268 | 0.268 | 0.268 | 0.301 |
| | Deflection (mm) | 2.40 | 2.40 | 2.80 | 2.80 | 3.10 | 3.15 | 2.65 | 2.80 | 3.10 | 3.15 |
| Paint film | Formulation | A | A | A | A | A | A | B | B | B | B |
| | Elastic work recovery (%) | 80.1 | 80.1 | 80.1 | 80.1 | 80.1 | 80.1 | 16.3 | 16.3 | 16.3 | 16.3 |
| | Thickness (μm) | 15.0 | 15.0 | 15.0 | 15.0 | 15.0 | 15.0 | 15.0 | 15.0 | 15.0 | 15.0 |
| Cover | Material | IV | IV | V | V | VI | VII | IV | VII | VI | IV |
| | Thickness (mm) | 0.8 | 0.8 | 0.8 | 0.8 | 0.8 | 0.8 | 0.8 | 0.8 | 0.8 | 0.8 |
| | Material hardness (Shore D) | 43 | 43 | 36 | 36 | 49 | 39 | 43 | 39 | 49 | 43 |
| Intermediate layer | Material | II | II | II | II | II | II | II | II | III | II |
| | Thickness (mm) | 1.2 | 1.2 | 1.0 | 1.2 | 1.7 | 1.7 | 1.1 | 1.1 | 1.7 | 1.7 |
| | Material hardness (Shore D) | 62 | 62 | 62 | 62 | 62 | 62 | 62 | 62 | 56 | 62 |
| Envelope layer | Material | | | I | | | | I | I | | |
| | Thickness (mm) | | | 1.0 | | | | 1.3 | 1.3 | | |
| | Material hardness (Shore D) | | | 51 | | | | 51 | 51 | | |

TABLE 4-continued

| | | Working Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Core | Diameter (mm) | 38.7 | 38.7 | 37.1 | 38.7 | 37.7 | 37.7 | 36.3 | 36.3 | 37.7 | 37.7 |
| | Deflection (mm) | 3.3 | 3.4 | 3.7 | 3.7 | 3.1 | 3.2 | 3.6 | 3.8 | 3.9 | 4.3 |
| | Hardness Center (Hc) | 63 | 62 | 60 | 58 | 55 | 55 | 60 | 60 | 62 | 61 |
| | profile 2 mm from center | 65 | 63 | 62 | 60 | 57 | 57 | 63 | 62 | 65 | 63 |
| | (JIS-C) 4 mm from center | 67 | 64 | 63 | 62 | 58 | 58 | 66 | 64 | 67 | 65 |
| | 6 mm from center | 68 | 66 | 64 | 64 | 60 | 60 | 68 | 66 | 68 | 65 |
| | 8 mm from center | 69 | 67 | 65 | 65 | 61 | 61 | 69 | 67 | 69 | 66 |
| | 10 mm from center | 69 | 67 | 66 | 65 | 63 | 63 | 69 | 68 | 69 | 66 |
| | 12 mm from center (H12) | 69 | 67 | 66 | 67 | 57 | 57 | 72 | 73 | 68 | 66 |
| | 14 mm from center | 72 | 72 | 69 | 77 | 71 | 71 | 79 | 78 | 70 | 69 |
| | 16 mm from center | 83 | 83 | 82 | 83 | 74 | 74 | 82 | 80 | 74 | 71 |
| | 18 mm from center | 86 | 86 | 86 | 83 | 72 | 72 | — | — | 76 | 74 |
| | Surface (Ho) | 93 | 92 | 90 | 90 | 80 | 80 | 86 | 85 | 82 | 80 |
| Hardness difference (1) (H12 − Hc) | | 6 | 6 | 5 | 10 | 2 | 2 | 12 | 13 | 6 | 6 |
| Hardness difference (2) (Ho − H12) | | 24 | 24 | 25 | 23 | 23 | 23 | 14 | 12 | 14 | 13 |
| Hardness difference (3) [(2) − (1)] | | 18 | 18 | 19 | 13 | 21 | 21 | 2 | 0 | 8 | 7 |
| Hardness difference (4) (Ho − Hc) | | 30 | 30 | 30 | 32 | 25 | 25 | 26 | 25 | 20 | 19 |
| Hardness distribution index (Hardness difference (3) × core deflection (mm)) | | 59 | 62 | 71 | 48 | 66 | 68 | 9 | −1 | 31 | 31 |
| Spin index (Hardness difference (3) × Dynamic coefficient of friction) | | 5.8 | 6.0 | 7.5 | 4.9 | 6.5 | 7.8 | 0.7 | −0.1 | 2.1 | 2.2 |

TABLE 5

| | | Working Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Flight (W#1, HS 50 m/s) | Initial velocity (m/s) | 72 | 72 | 72 | 72 | 71 | 71 | 72 | 72 | 72 | 72 |
| | Spin rate (rpm) | 2,374 | 2,307 | 2,461 | 2,453 | 2,193 | 2,205 | 2,416 | 2,455 | 2,313 | 2,393 |
| | Distance (m) | 266.1 | 267.0 | 265.0 | 265.0 | 264.2 | 264.0 | 265.5 | 265.0 | 262.5 | 260.9 |
| | Rating | good | good | good | good | good | good | good | good | NG | NG |
| Spin performance on approach shots (SW) | Spin rate (rpm) | 1370 | 1333 | 1563 | 1570 | 1240 | 1400 | 1183 | 1190 | 1133 | 1190 |
| | Rating | good | good | good | good | good | good | NG | NG | NG | NG |

From the test results of Table 5, the following matters can be observed.

In Comparative Example 1, the (Ho–H12)–(H12–Hc) value in the core hardness profile was small and the spin index fell outside the specified range of the invention, as a result of which the spin performance on approach shots was poor.

Similarly, in Comparative Example 2, the (Ho–H12)–(H12–Hc) value in the core hardness profile was small and the spin index fell outside the specified range of the invention, as a result of which the spin performance on approach shots was poor.

In Comparative Example 3, the (Ho–H12)–(H12–Hc) value in the core hardness profile was small and the spin index fell outside the specified range of the invention. As a result, the flight performance and the spin performance on approach shots were poor.

In Comparative Example 4, the (Ho–H12)–(H12–Hc) value in the core hardness profile was small and the spin index fell outside the specified range of the invention. As a result, here too, the flight performance and the spin performance on approach shots were poor.

Working Examples 7 to 12, Comparative Example 5

Formation of Two-Layer Core

In each Example, an inner core layer was produced by preparing the inner core layer-forming rubber composition shown in Table 6 and subsequently carrying out molding and vulcanization under the vulcanization conditions shown in the same table. Next, one-half of the outer core layer-forming rubber material was placed in an outer core layer mold, sandwiched between the mold and a convex die of the same radius as the inner core layer and heated at 60 to 155° C. for 1 to 5 minutes, following which it was removed from the mold, thereby producing an outer core layer in the shape of a half-cup. A half-cup was similarly produced using the remaining half of the outer core layer material, the two half-cups were used to enclose the molded and vulcanized inner core layer, and molding and vulcanization was carried out under the vulcanization conditions indicated in the table, thereby producing an overall core (inner core layer+outer core layer) in each Example.

TABLE 6

| Two-core layer formulations (pbw) | | Working Example | | | | | | Comparative Example |
|---|---|---|---|---|---|---|---|---|
| | | 7 | 8 | 9 | 10 | 11 | 12 | 5 |
| Inner core layer | Polybutadiene (1) | 20 | 20 | 20 | 20 | 20 | 20 | 80 |
| | Polybutadiene (2) | 80 | 80 | 80 | 80 | 80 | 80 | 20 |
| | Zinc acrylate | 19.1 | 15.3 | 19.1 | 19.1 | 15.3 | 19.1 | 25.5 |
| | Organic peroxide (1) | 0.3 | 0.3 | 0.3 | 0.3 | 0.3 | 0.3 | 1.0 |
| | Organic peroxide (2) | 0.3 | 0.3 | 0.3 | 0.3 | 0.3 | 0.3 | |
| | Antioxidant | 0.1 | 0.1 | 0.1 | 0.1 | 0.1 | 0.1 | 0.1 |
| | Barium sulfate (III) | 21.1 | 22.8 | 21.1 | 21.1 | 22.8 | 21.1 | 21.0 |
| | Zinc oxide | 4.0 | 4.0 | 4.0 | 4.0 | 4.0 | 4.0 | |
| | Zinc salt of pentachlorothiophenol | | | | | | | 0.5 |
| | Water | | | | | | | 0.9 |
| Vulcanization temperature (° C.) | | 155 | 155 | 155 | 155 | 155 | 155 | 152 |
| Vulcanization time (minutes) | | 13 | 13 | 13 | 13 | 13 | 13 | 19 |
| Outer core layer | Polybutadiene (1) | 20 | 20 | 20 | 20 | 20 | 20 | 20 |
| | Polybutadiene (2) | 80 | 80 | 80 | 80 | 80 | 80 | 80 |
| | Unsaturated metal carboxylate | 39.2 | 34.9 | 39.2 | 39.2 | 34.9 | 39.2 | 33.2 |
| | Organic peroxide (1) | | | | | | | |
| | Organic peroxide (2) | 1.2 | 1.2 | 1.2 | 1.2 | 1.2 | 1.2 | 1.2 |
| | Antioxidant | 0.1 | 0.1 | 0.1 | 0.1 | 0.1 | 0.1 | 0.1 |
| | Barium sulfate (III) | 11.8 | 13.7 | 11.8 | 11.8 | 13.7 | 11.8 | 14.5 |
| | Zinc oxide | 4.0 | 4.0 | 4.0 | 4.0 | 4.0 | 4.0 | 4.0 |
| | Zinc salt of pentachlorothiophenol | 0.1 | 0.1 | 0.1 | 0.1 | 0.1 | 0.1 | |
| Vulcanization temperature (° C.) | | 155 | 155 | 155 | 155 | 155 | 155 | 155 |
| Vulcanization time (minutes) | | 13 | 13 | 13 | 13 | 13 | 13 | 13 |

Details on the ingredients in Table 6 are the same as in Table 1. The barium sulfate (III) in Table 6 was as follows.
Barium sulfate (III): Available under the trade name "Precipitated Barium Sulfate #300" from Sakai Chemical Industry Co., Ltd.

Formation of Intermediate Layer and Cover (Outermost Layer)

Next, in Working Examples 7 to 12 and Comparative Example 5, an intermediate layer was formed over the two-layer core by injection-molding an intermediate layer material formulated as shown under II in Table 2 or IX in Table 7 below, thereby giving an intermediate layer-encased sphere. A cover (outermost layer) was then formed over the resulting intermediate layer-encased sphere by injection-molding a cover material formulated as shown under VIII in Table 7 below. At this time, a plurality of dimples in a specific configuration common to all of the Working Examples and the Comparative Examples was formed on the cover surface. In Working Examples 7 to 12 and Comparative Example 5, treatment of the cover surface as described above for Working Examples 1 to 6 and Comparative Examples 1 to 4 was not carried out.

TABLE 7

| | Resin formulation (pbw) | |
|---|---|---|
| | VIII | IX |
| AM7318 | | 70 |
| AM7329 | | 15 |
| Himilan 1706 | | 15 |
| Trimethylolpropane | | 1.1 |

TABLE 7-continued

| | Resin formulation (pbw) | |
|---|---|---|
| | VIII | IX |
| T-8290 | 75 | |
| T-8283 | 25 | |
| Hytrel 4001 | 11 | |
| Silicone wax | 0.6 | |
| Polyethylene wax | 1.2 | |
| Isocyanate compound | 7.5 | |
| Titanium oxide | 3.9 | |

Details on the materials in Table 7 are the same as in Table 2. Details on other ingredients are as follows.
AM7318, AM7329: Ionomer resins available from DuPont-Mitsui Polychemicals Co., Ltd.
Hytrel 4001: A polyester elastomer available from DuPont-Toray Co., Ltd.
Isocyanate compound: 4,4'-Diphenylmethane diisocyanate Formation of Paint Film Layer Next, a paint formulated as shown in Table 3 below was applied with an air spray gun onto the cover (outermost layer) surface on which numerous dimples had been formed, thereby producing a golf ball having a 15 μm-thick paint film layer formed thereon.

The physical properties and other above-mentioned parameters for the golf balls obtained in Working Examples 7 to 12 and Comparative Example 5 were measured in the same way as in Working Examples 1 to 6 and Comparative Example 1. The results are shown in Table 8. In addition, the flight performance (W#1) and the spin performance on approach shots of the golf ball in each Working Example and Comparative Example were evaluated under the same criteria as described above. The results are shown in Table 9.

TABLE 8

|  |  | Working Example | | | | | | Comp. Example |
|---|---|---|---|---|---|---|---|---|
|  |  | 7 | 8 | 9 | 10 | 11 | 12 | 5 |
| Ball construction | | 2-layer core/ 2-layer cover | 2-layer core/ 2-layer cover | 2-layer core/ 2-layer cover | 2-layer core/ 2-layer cover | 2-layer core/ 2-layer cover | 2-layer core/ 2-layer cover | 2-layer core/ 2-layer cover |
| Ball | Dynamic coefficient of friction | 0.310 | 0.310 | 0.310 | 0.310 | 0.310 | 0.310 | 0.310 |
|  | Deflection (mm) | 2.27 | 2.62 | 2.25 | 2.54 | 2.95 | 2.27 | 2.27 |
| Paint film | Formulation | A | A | A | A | A | A | A |
|  | Elastic work recovery (%) | 80.1 | 80.1 | 80.1 | 80.1 | 80.1 | 80.1 | 80.1 |
|  | Thickness (μm) | 15.0 | 15.0 | 15.0 | 15.0 | 15.0 | 15.0 | 15.0 |
| Cover | Material | VIII | VIII | VIII | VIII | VIII | VIII | VIII |
|  | Thickness (mm) | 0.8 | 0.8 | 0.8 | 0.8 | 0.8 | 0.8 | 0.8 |
|  | Material hardness (Shore D) | 47 | 47 | 47 | 47 | 47 | 47 | 47 |
| Intermediate layer | Material | II | II | IX | II | II | II | II |
|  | Thickness (mm) | 1.2 | 1.2 | 1.2 | 1.2 | 1.2 | 1.2 | 1.2 |
|  | Material hardness (Shore D) | 64 | 64 | 66 | 64 | 64 | 64 | 64 |
|  | Surface hardness (JIS-C) | 98 | 98 | 99 | 98 | 98 | 98 | 98 |
| Core | Inner core layer Diameter (mm) | 24.2 | 24.2 | 24.2 | 28.7 | 28.7 | 24.2 | 24.2 |
|  | Deflection (mm) | 5.4 | 6.4 | 5.4 | 5.6 | 6.7 | 5.4 | 5.0 |
|  | Surface hardness (JIS-C) | 69 | 62 | 69 | 68 | 60 | 69 | 74 |
|  | Inner core layer + Outer core layer Diameter (mm) | 38.7 | 38.7 | 38.7 | 38.7 | 38.6 | 38.7 | 38.6 |
|  | Deflection (mm) | 3.0 | 3.5 | 3.0 | 3.5 | 4.3 | 3.0 | 3.2 |
|  | Hardness profile (JIS-C) Center (Hc) | 58 | 51 | 58 | 52 | 48 | 58 | 63 |
|  | 2 mm from center | 57 | 52 | 57 | 53 | 50 | 57 | 63 |
|  | 4 mm from center | 60 | 54 | 60 | 55 | 51 | 60 | 65 |
|  | 6 mm from center | 63 | 56 | 63 | 58 | 54 | 63 | 67 |
|  | 8 mm from center | 66 | 57 | 66 | 62 | 56 | 66 | 70 |
|  | 10 mm from center | 66 | 58 | 66 | 64 | 57 | 66 | 71 |
|  | 12 mm from center (H12) | 67 | 59 | 67 | 64 | 57 | 67 | 72 |
|  | 14 mm from center | 77 | 74 | 77 | 67 | 62 | 77 | 76 |
|  | 16 mm from center | 82 | 79 | 82 | 82 | 81 | 82 | 81 |
|  | 18 mm from center | 85 | 82 | 85 | 85 | 83 | 85 | 83 |
|  | Surface (Ho) | 91 | 88 | 91 | 91 | 88 | 91 | 90 |
|  | (1) Hardness difference H12 − Hc | 9 | 8 | 9 | 12 | 9 | 9 | 9 |
|  | (2) Hardness difference Ho − H12 | 24 | 29 | 24 | 26 | 31 | 24 | 18 |
|  | (3) Hardness difference (2) − (1) | 15 | 21 | 15 | 14 | 22 | 15 | 9 |
|  | (4) Hardness difference Ho − Hc | 34 | 37 | 34 | 38 | 40 | 34 | 27 |
| Hardness profile index (3) × Core deflection (mm) | | 44 | 75 | 44 | 50 | 96 | 44 | 28 |
| Spin index (3) × Dynamic coefficient of friction | | 4.5 | 6.6 | 4.5 | 4.4 | 6.9 | 4.5 | 2.7 |
| Hardness relationship: Intermediate layer surface − Inner core layer surface (JIS-C) | | 29 | 36 | 30 | 30 | 38 | 29 | 24 |

TABLE 9

|  |  | Working Example | | | | | | Comp. Example |
|---|---|---|---|---|---|---|---|---|
|  |  | 7 | 8 | 9 | 10 | 11 | 12 | 5 |
| Flight (W#1; HS, 50 m/s) | Initial velocity (m/s) | 72 | 72 | 73 | 72 | 71 | 72 | 72 |
|  | Spin rate (rpm) | 2,350 | 2,183 | 2,342 | 2,211 | 2,037 | 2,352 | 2,456 |
|  | Distance (m) | 266.1 | 264.3 | 267.2 | 262.8 | 263.7 | 267.2 | 257.4 |
|  | Rating | good | good | good | good | good | good | NG |
| Spin performance on approach shots (SW) | Spin rate (rpm) | 1,370 | 1,345 | 1,396 | 1,343 | 1,295 | 1,369 | 1,364 |
|  | Rating | good | good | good | good | good | good | good |

The following was apparent from the test results in Table 9.

In Comparative Example 5, the (Ho−H12)−(H12−Hc) value in the core hardness profile was small. Also, the spin index and hardness profile index fell outside of the specified ranges and were thus inadequate. As a result, the ball had a poor flight performance.

The invention claimed is:

1. A multi-piece solid golf ball comprising a core, a cover and an intermediate layer therebetween and having a paint film layer formed on a surface of the cover, wherein, letting Hc be the JIS-C hardness at a center of the core, H12 be the JIS-C hardness at a position 12 mm from the core center and Ho be the JIS-C hardness at a surface of the core, the core has a hardness profile which satisfies condition (3) below $$(Ho-H12)-(H12-Hc) \geq 10 \qquad (3)$$

(with the proviso that $65 \leq Ho \leq 99$ and $40 \leq Hc \leq 78$); letting (Ho−H12)−(H12−Hc) in condition (3) be A, the spin index of the ball, defined as the dynamic coefficient of friction for the ball multiplied by A, is from 4.9 to 7.8; and the hardness profile index, defined as the deflection (mm) of the core when compressed under a final load of 1,275 N (130 kgf) from an initial load of 98 N (10 kgf) multiplied by A, is at least 40, and wherein the dynamic coefficient of friction for the ball is at least 0.324.

2. The golf ball of claim 1, wherein the surface of the cover is treated with a polyisocyanate compound that is free of organic solvent.

3. The golf ball of claim 2, wherein the polyisocyanate compound is one, or a mixture of two or more, selected from the group consisting of tolylene-2,6-diisocyanate, tolylene-2,4-diisocyanate, 4,4′-diphenylmethane diisocyanate, polymethylene polyphenyl polyisocyanate, 1,5-diisocyanatonaphthalene, isophorone diisocyanate (including isomer mixtures), dicyclohexylmethane-4,4′-diisocyanate, hexamethylene-1,6-diisocyanate, m-xylylene diisocyanate, hydrogenated xylylene diisocyanate, tolidine diisocyanate, norbornene diisocyanate, derivatives thereof, and prepolymers formed of said polyisocyanate compounds.

4. The golf ball of claim 1, wherein the paint film layer has an elastic work recovery of from 30 to 98%.

5. The golf ball of claim 1 which satisfies condition (4) below:

$$20 \leq Ho-Hc \leq 45. \qquad (4)$$

6. The golf ball of claim 1, wherein the core has a two-layer construction consisting of an inner layer and an outer layer.

7. The golf ball of claim 6 which satisfies the following condition:

(JIS-C hardness at surface of sphere obtained by encasing core with intermediate layer)−(JIS-C hardness at surface of inner core layer)≥25.

8. The golf ball of claim 1, wherein the core deflection (mm) when compressed under a final load of 1,275 N (130 kgf) from an initial load of 98 N (10 kgf), is from 2.5 to 3.7 mm.

9. The golf ball of claim 1, wherein water is included in the core material in an amount of from 0.1 to 5 parts by weight per 100 parts by weight of a base rubber.

10. The golf ball of claim 1, wherein the cover has a material hardness of from 27 to 43 expressed in terms of Shore D hardness.

* * * * *